(12) United States Patent
Lipscomb et al.

(10) Patent No.: US 6,954,196 B1
(45) Date of Patent: Oct. 11, 2005

(54) SYSTEM AND METHOD FOR RECONCILING MULTIPLE INPUTS

(75) Inventors: James S. Lipscomb, Yorktown Heights, NY (US); Sih-Pin Subrina Chang, Old Tappan, NJ (US); Shu-Chun Jeane Chen, Chappaqua, NY (US); Keeranoor G. Kumar, Randolph, NJ (US); Jai Menon, Croton-On-Hudson, NY (US); Arun Ramchandra, Danbury, CT (US); Liang-Jie Zhang, White Plains, NY (US); Robert C. Plotkin, Dobbs Ferry, NY (US); Eric H. Hoffman, Tenafly, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/444,317

(22) Filed: Nov. 22, 1999

(51) Int. Cl.[7] ................................................ G09G 5/00
(52) U.S. Cl. ...................................... 345/156; 345/473
(58) Field of Search ........................ 345/440, 156–158, 345/473–475, 441, 701, 700, 754, 764, 856.86, 345/631–632, 629, 636, 751–755; 700/17, 700/83.84, 85, 47; 715/700, 701

(56) References Cited

U.S. PATENT DOCUMENTS

| | | | | |
|---|---|---|---|---|
| 5,135,468 A | * | 8/1992 | Meissner | 600/28 |
| 5,179,639 A | * | 1/1993 | Taaffe | 345/428 |
| 5,442,788 A | * | 8/1995 | Bier | 345/751 |
| 5,694,150 A | * | 12/1997 | Sigona et al. | 345/856 |
| 5,794,017 A | * | 8/1998 | Evans et al. | 345/213 |
| 5,828,369 A | * | 10/1998 | Foster | 707/500.1 |
| 5,940,529 A | * | 8/1999 | Buckley | 382/155 |
| 6,126,449 A | * | 10/2000 | Burns | 434/252 |
| 6,307,561 B1 | * | 10/2001 | Doi et al. | 345/473 |

FOREIGN PATENT DOCUMENTS

WO    WO 00/79484 A1 * 12/2000 ........... G06T 13/00

* cited by examiner

*Primary Examiner*—Regina Liang

(57) ABSTRACT

The present invention is directed to a system and method of reconciling multiple control inputs to a processor and controlling an output in an interface. The method provides a degraded output response when the control inputs are asserted simultaneously, and provides an increased output response when the inputs act individually and alternately. This system and method acts to provide feedback to the operator or operators controlling the inputs so as to encourage the operator(s) to assert the inputs individually, and discourage the operator(s) from asserting the inputs simultaneously.

17 Claims, 7 Drawing Sheets

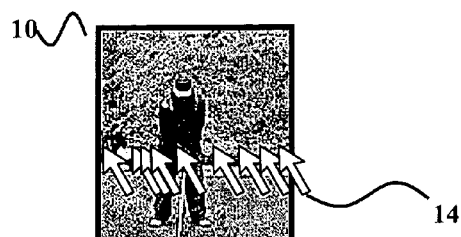
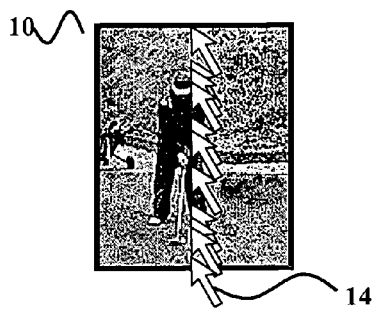
FIG. 2A  FIG. 2B
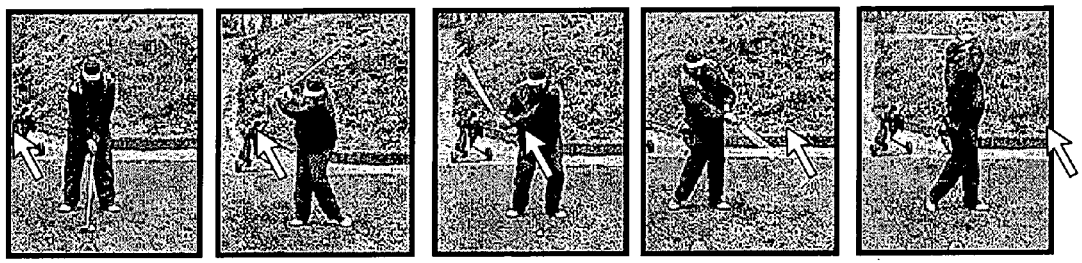
FIG. 2C
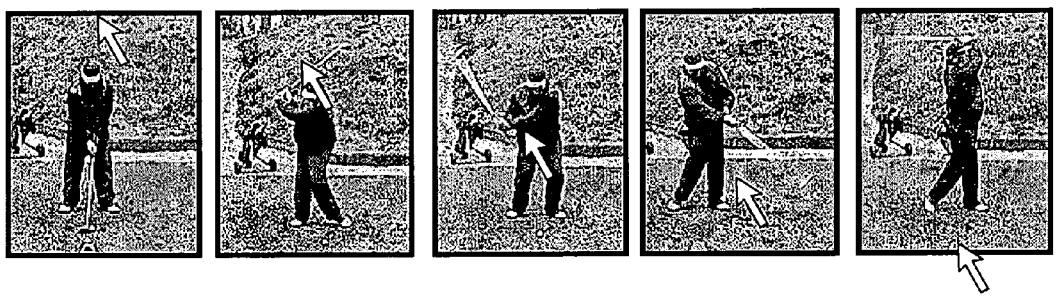
FIG. 2D

SYSTEM AND METHOD FOR RECONCILING MULTIPLE INPUTS

FIELD OF THE INVENTION

The present invention relates to interfaces for computer systems. More specifically, the invention relates to an interface and a method of reconciling multiple inputs for controlling one or more interface outputs.

BACKGROUND OF THE INVENTION

There are many applications for computer user interfaces where it is desirable to have multiple inputs controlling an output. Sometimes the multiple inputs are all under the control of a single user, and sometimes the multiple inputs are controlled by different users. If the inputs are asserted simultaneously, the output response can be erratic, confusing, or jerky, particularly if the multiple inputs are fighting for control. Additionally, for some applications, simultaneous assertion of inputs can be unmeaningful for the particular context. What is needed in these cases is a system and method of operation that encourages the one or more users controlling multiple inputs to assert inputs individually rather than simultaneously.

SUMMARY OF THE INVENTION

In one embodiment a computer system for reconciling multiple inputs includes an input device connected to a processor. The input device provides multiple inputs to the processor, such as x and y inputs. The CPU is coupled to a disk drive or memory 5 and a display via a frame buffer. The processor reconciles the multiple inputs by combining the inputs and then degrading the output response when the inputs are asserted simultaneously, and increasing the output response when one input is asserted substantially more than the other inputs. This system and method of operation acts to provide feedback to the operator or operators controlling the inputs so as to encourage the operator(s) to assert the inputs individually, and discourage the operator(s) from asserting the inputs simultaneously.

The method of reconciling multiple inputs comprises receiving a plurality of inputs, providing an output based on the plurality inputs, wherein the output has a degraded response when more then one of the plurality of inputs is asserted simultaneously and an increased response when one of the plurality of inputs is asserted significantly more than the other inputs. The plurality of inputs can be represented by an input vector in a coordinate space. The output response is a maximum when the vector lies along a coordinate axis in the coordinate space, and the output response is a minimum when the vector lies along a diagonal in the coordinate space. Preferably, the output response decreases monotonically as the input vector direction changes from an alignment along an axis to an alignment along a diagonal. Also, it is often desirable if there is an area in the vicinity of the diagonal wherein the output response is zero.

One application for this method of reconciling multiple inputs is where the plurality of inputs controls an animation. The output response is animation motion: either forwards or backwards. Up-down motion of an input device can form one input, and left-right motion can form the second input. Other applications include the situation where a first input controls a first animation, and a second input controls a second animation.

Another application is where the first input produces a first type of output response, and the second input produces a second type of output response. For example, the first type of output response is displaying a picture of a different room within a house, and the second type of output response is displaying a corresponding room within a different house.

Another application is where the plurality of inputs are received from a plurality of users, each user controlling at least one input. In this situation the plurality of users may all be controlling the same output. The more the users act individually the more the output responds, and the more the users act simultaneously the more the output is degraded.

BRIEF DESCRIPTION OF THE DRAWINGS

FIG. 2A is an illustration of a user controlling a cursor by dragging a mouse across an animation frame in a left-right direction.

FIG. 2B is an illustration of a user controlling a cursor by dragging a mouse across an animation frame in an up-down direction.

FIG. 2C is an illustration of successive animation frames from left to right as the user drags the mouse left to right.

FIG. 2D is an illustration of successive animation frames from top to bottom as the user drags the mouse from top to bottom.

DETAILED DESCRIPTION OF THE INVENTION

The present invention is directed to a computer user interface and a method for reconciling multiple control inputs to the computer. The method provides a degraded output response when the control inputs are asserted simultaneously, and provides an increased output response when the inputs act individually. This method acts to provide feedback to the operator or operators controlling the inputs so as to encourage the operator(s) to assert the inputs individually, and discourage the operator(s) from asserting the inputs simultaneously.

There are a variety of applications for this method of reconciling inputs. One application is a user-controlled animation wherein the animation is controlled by two inputs: an x-input and a y-input. This application is described in more detail as follows with respect to FIGS. 1 and 2A–2D.

Figure 1:
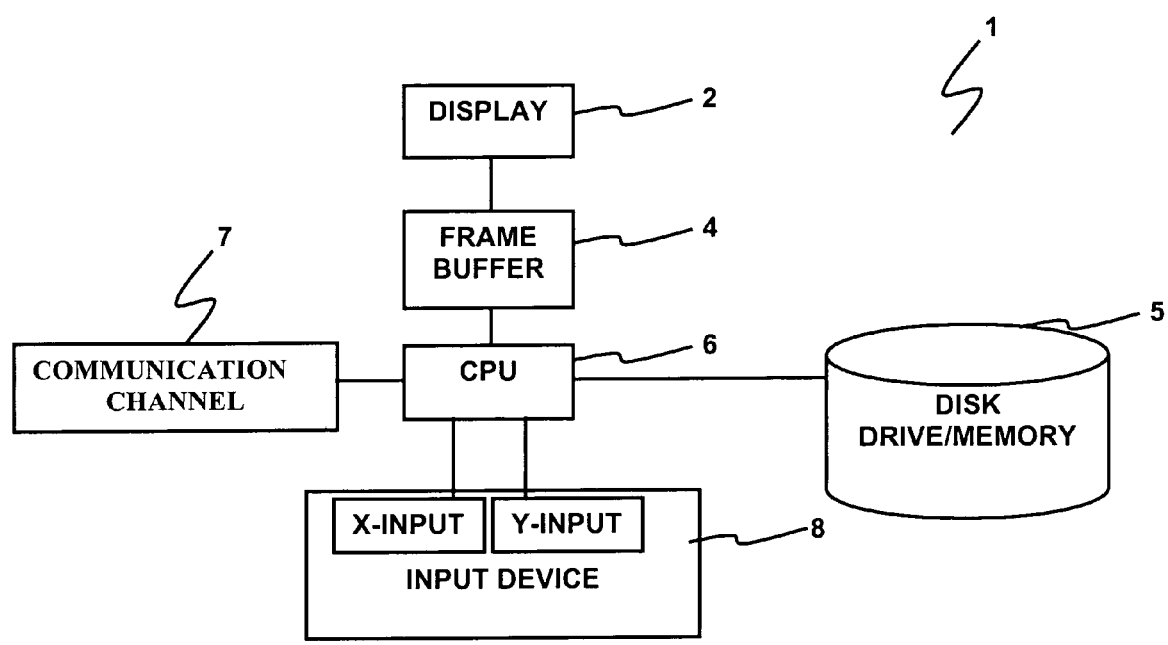
FIG. 1 is a block diagram of a computer system using the present invention.

FIG. 1 shows a block diagram of the system 1 of the present invention. Disk drive or memory 5 stores animation media data. CPU 6 is running an animation software program which accesses the animation media data stored on disk drive 5 and controls the display of the animation. Alternatively, CPU 6 could also receive animation media data and/or program instructions over an optional communications channel 7. For example, CPU 6 could be connected to the Internet and receive a Java-script animation from a web server on the Internet. The CPU could also transmit the inputs from input device 8 to the web server over the communications channel 7.

The CPU 6 outputs successive animation frames to be stored in frame buffer 4. The display 2 displays the contents of frame buffer 4 so that the computer user can view the animation. The computer receives inputs from an input device 8 which allows the user to control the animation to move forwards or backwards. The input device could be a mouse, or a joystick, or a track-ball, or a touch pad, or any of numerous well-known control devices. The input device produces multiple inputs. In the example shown in FIG. 1, the input device produces an x-input and a y-input.

FIGS. 2A–2D illustrates the animation of a golfer being shown on display 2. FIG. 2A illustrates a still picture 10 of a golfer who is about to take a swing. A user can control the animation of the golfer by using an input device 8. For the purposes of the explanation below, it will be assumed that the user is using a mouse, although any input device would be equally satisfactory.

A user can control an animation of the golfer taking a swing at the golf ball by dragging the mouse to move the cursor 14 horizontally across the picture 10. As the user moves the cursor to the right, the picture 10 will change to show successive animation frames, so that the golfer will appear to take a swing. As the user drags the mouse to the right, the animation moves forward. If the user drags the mouse to the left, the animation will move backwards.

FIG. 2C illustrates successive frames of animation as the user drags cursor 14 across the picture 10 from left to right. After the user reaches the last frame on the right in FIG. 2C, the user could then drag the cursor to the left, and the animation would proceed in reverse back to the leftmost animation frame; the golfer would appear to swing in reverse. By stopping the cursor at any point during the swing, the user can stop the animation at that point and view the still animation frame.

This method illustrated in FIGS. 2A and 2C demonstrates the use of a single input to control the animation: an x-input. The direction of animation is controlled by dragging the mouse along the x-axis; that is, either to the right or left. The single x-input determines the response of the animation. The speed at which the mouse is dragged can be used to control the speed at which the animation proceeds.

In order to increase the flexibility of control for the user, the user can be given the ability to control the animation by two-input motion rather than one-input motion. That can be accomplished by allowing the user to control the animation by either up-down motion (y-input) or left-right motion (x-input). FIG. 2B illustrates a user controlling the animation by up-down cursor motion. The animation proceeds forwards as the user drags the cursor down, and the animation reverses when the cursor is dragged upwards. FIG. 2D illustrates successive animation frames when the cursor is dragged vertically from top to bottom or from bottom to top.

Another reason why it is preferable to allow the animation to be controlled by 2-input motion (x-input and y-input) rather than just 1-input motion, in addition to providing more flexibility for an experienced user, is that a novice user will have an easier time figuring out how to control the animation. When designing a user interface for a computer software program, it is desirable to allow the user to intuitively figure out how to use the controls instead of requiring the user to read a detailed set of instructions. In this way the user can play around with the controls and try various things, and thereby quickly learn how to use the controls without having to read a detailed set of instructions. For example, suppose in the animation example shown in FIGS. 2A–2D, there appeared the following caption beneath the picture 10: "click and drag." A novice user who did not know how to control the animation might try to control the animation by just playing around with the mouse and trying various actions such as dragging up, dragging left, and dragging at various angles.

When a novice user sees the picture 10 with a caption "click and drag", the novice might try dragging right, or he might try dragging up. Either way, the novice will get some response. If the novice tries moving up and down first, he might just continue with up/down movement and not even try left/right movement. What is important is that the user gets feedback that what the user is doing will move the animation. If the user gets no response, the user might think that the animation doesn't work. The user might then just walk away and not try any further action. If the user is allowed two input motion to control a single output, however, the user can try either up-down motion or left-right motion, and the animation will respond. The user will thus be able to quickly realize that the animation is working and quickly determine how to operate the animation.

Figure 3:
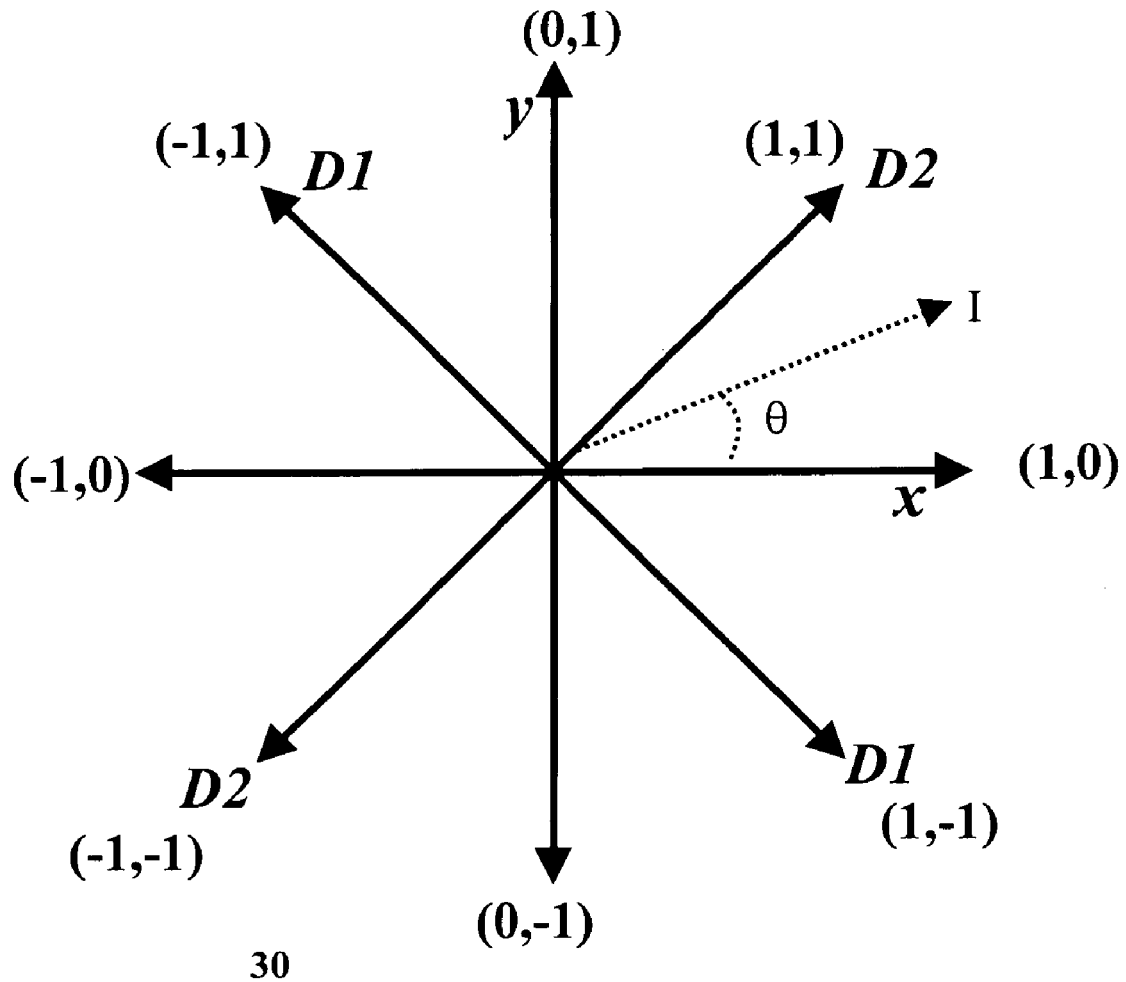
FIG. 3 depicts a 2 dimensional coordinate space, and the inputs received from an exemplary input device.

In order to provide the user the flexibility of controlling the animation with both the x input and the y input, an algorithm must be used to reconcile the two inputs. FIG. 3 depicts an exemplary set of inputs that are received from a mouse when it moves in various directions. When the mouse is moved along the x axis to the right, a (1,0) is received by the processor, meaning that the x-input is 1, and the y-input is 0. This indicates that the mouse is being moved to the right along the x-axis. When the mouse is moved up, a (0,1) is received. When the mouse is moved up and to the right along diagonal D2 a (1,1) is received. When the mouse is moved up and to the left along diagonal D1, a (−1,1) is received. The vector I shown in FIG. 2, represents the direction of motion that the user drags the mouse. The mouse is being moved in a direction which forms an angle θ with the x-axis.

The inputs do not have to be restricted to −1, 0, and 1. Inputs can also be fractional (e.g. −0.5, 0.7) or large (e.g. −2.2, 19.3). The magnitude of the input is representative of the speed of motion in the associated direction. For example, an input of (2,0) would indicate that the mouse is being dragged to the right along the x-axis with twice the speed produced by an input of (1,0). An input of (0.5, 0.5) would indicate motion along the diagonal D2 up and to the right at half the speed produced by input (1,1).

One simple algorithm that could be used to reconcile the two inputs would simply be to add the x and y inputs. For example, suppose there is an output response O, where O=x+y, and where output response O controls the speed of the animation. If O is positive, the animation moves forward, whereas if O is negative, the animation moves backwards.

A problem arises with this simple method of adding the inputs, however, when the user moves the mouse in an angled direction. For instance, consider what happens when the user moves the mouse up and to the right, along the 45 degree diagonal, so that an input of (1,1) is received (x input is 1 and y input is 1, θ=45°). Adding the x and y inputs will produce an output response O=2. This will cause the animation to move forward at double speed. To eliminate the effect of moving at double-speed along this diagonal, the output O of the animation could simply be clipped to a maximum of one.

Movement along the other diagonal D1, however, is more problematic. As the user moves the cursor up and to the left, an input of (−1, 1) is received. This produces an output response O=−1+1=0. Thus, adding the x and y inputs together produces zero motion of the animation along this diagonal.

This type of response will be confusing to the user. One reason that it is confusing is that the response along the different diagonals is asymmetric. An input motion along diagonal D2 causes the animation to move forwards or backwards, whereas motion along the diagonal D1 produces no animation motion. This asymmetry is confusing and non-intuitive to the user, who will have a difficult time understanding how to control the animation. When the user moves up and to the right, the animation will move forward. The user will then assume that motion down and to the right will also move the animation forward. However, when the user tries moving down and to the right, the animation will freeze.

Another reason that summing the x and y inputs will produce a confusing response is that the output response will vary radically for small variations of motion near diagonal D1. For instance, if the user moves diagonally up and to the left, but a little more up than left, the animation will move forward. If the user moves diagonally up and to the left, but a little more left than up, the animation will move backwards. So, a tiny difference in the trajectory of the path of the mouse, up and to the left, will either move the animation forward or backward. The user will get radically different responses for a tiny difference in the way the mouse is moving.

Another undesirable effect of simply adding the inputs is that the user could get jittery motion along diagonal D1. As the user moves up and to the left, the mouse may send a series of (x,y) inputs nearly equalling (−1,1), for example the sequence (−0.9, 1.0), (−1.0, 0.9), (−0.8, 1.1). When this happens, the output response O will alternately be positive when −x<y and negative when −x>y. The animation will thus jitter back and forth, because it is receiving contradictory inputs to move forwards, backwards, forwards, backwards, etc. that will flip the animation from frame n to frame n−1 and back. This jittery effect will be especially pronounced when the animation itself has a low frame rate (for example 10 frames per second), and thus appears jerky even under normal conditions. In more general terms, the jittery effect is more pronounced when the display of the output is discrete at a rate at which individual output displays can be distinguished by the human eye.

This response will be confusing and non-intuitive to the user, since the user will not understand what kind of control dragging up and to the left along diagonal D1 really produces; sometimes it seems to produce forward motion, sometimes it seems to produce backwards motion and sometimes the animation just jitters back and forth. All three different behaviors depend on slight variations in the user's trajectory of mouse motion up and to the left. To overcome this problem of confusing response along the diagonals, an improved algorithm is needed, rather than just summing the x and y inputs. An ideal way to handle this diagonal problem is to degrade the output response when the user moves the mouse in an angled direction and to increase the output response as the user moves in closer alignment with the x or y axis. In other words, when only one of the inputs, x or y, is close to zero, then the output is increased. When both of the inputs x and y are asserted and they have nearly equal magnitude, then the output response is degraded.

The output should be at a minimum along the 45 degree diagonals D1 and D2, preferably even zero, so that the user gets little or no response when dragging the mouse along the diagonals. As the user changes the angle of dragging to be more closely aligned with either the x or y axes, the output response should increase.

This method of control has the effect of intuitively teaching the user how to control the animation by providing feedback to the user. As the user moves the angle of dragging closer to an axis the response increases and as the user moves closer to a diagonal the response decreases. Therefore, an operator who does not know how to control the animation, can pick up the mouse and by playing around with it, the operator can instinctively sense how to control the animation, because the operator is receiving feedback from the animation's output response. The output response encourages the operator to move the mouse along the axes, rather than the diagonals, because the user finds that the output becomes more responsive as he or she moves in closer alignment with the axes. Another way of saying this is that the output response encourages the x-input and the y-input to be asserted independently, rather than simultaneously. When the operator tries to move along a diagonal, the animation slows down and when the operator tries to move more along an axis, the animation speeds up. Thus the operator instinctively and quickly learns how to control the system without reading a detailed set of instructions.

Figure 4A:
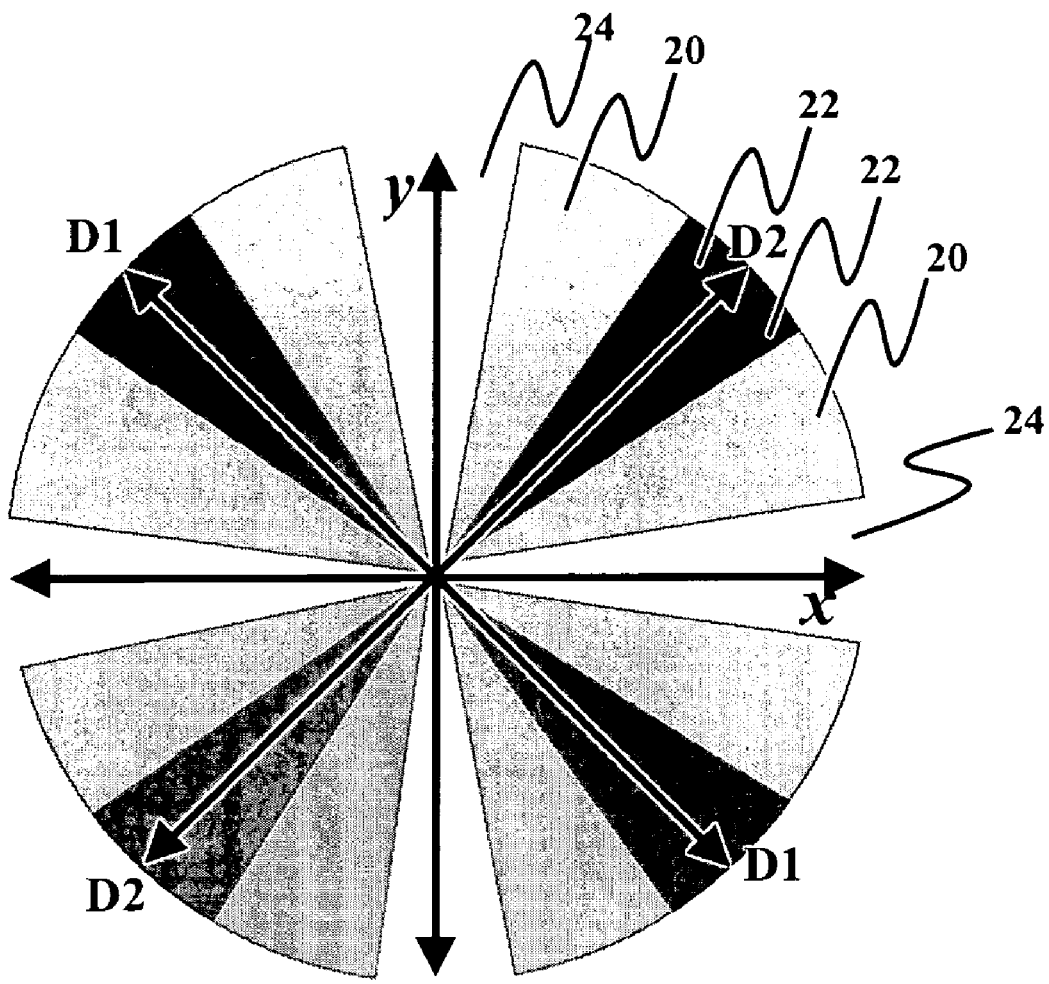
FIG. 4A depicts a 2 dimensional coordinate space, and exemplary mapping of degraded output response.

FIG. 4A illustrates an example of output response degradation near the diagonals. For motion in the darkly shaded areas 22 near the diagonals D1 and D2, the output response would be degraded to be at a minimum, preferably zero. In the lightly shaded areas 20, the output response would be more lightly degraded. In the non-shaded areas 24, there would be no degrading. Thus, the output response increases for input motions at angles more closely aligned with the axes. This output response provides feedback to the user to encourage the user to move towards the axes when controlling the mouse. For all motion that falls "above" diagonal D1, the output response is positive and the animation moves forward (except for motion in the darkly shaded region close to the diagonals where output response may be zero). For all motion that falls "below" the diagonal D1, the output response is negative and the animation moves backwards.

As described earlier, when the output response is determined by simply summing the x and y inputs, the motion along diagonal D1 produces erratic behavior. It would be possible to degrade the response just along diagonal D1, and not along diagonal D2. However, it is much more preferable to degrade the response near both diagonals D1 and D2 so that the output is symmetric. Otherwise, the user will be confused when motion along one diagonal produces a response, and the other diagonal produces no response.

It is often preferable to use a fairly wide area of degraded response 22 around the diagonals. Using a wider area of degraded response has two advantages:

(1) It avoids confusion for the user since the exact angle of motion along the diagonal is not easy to see.

(2) It helps reduce jittery back and forth motion around diagonal D1. This jittery effect can be especially pronounced for "step-wise" output motion. When step-wise output motion is used, several inputs in succession are received from the mouse and summed before an output response is produced; an output response is not produced until a threshold of incremental output is reached. These occasional big output responses produced by step-wise output motion in effect magnify the response to the input. A wide area of degraded output response is needed to avoid big jerky motions back and forth near the diagonal.

Figure 4B:
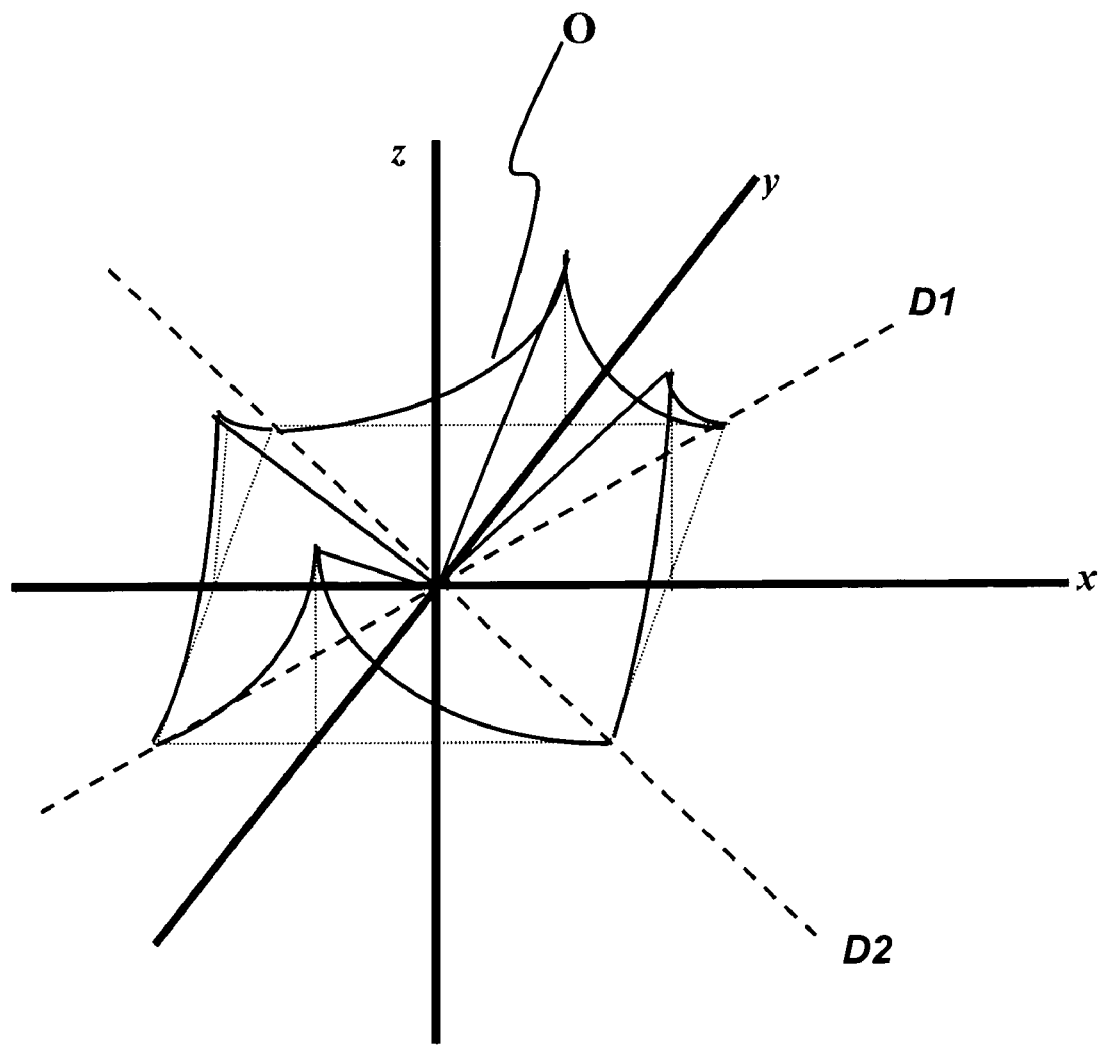
FIG. 4B is a 3-dimensional graph illustrating output response degradation.

FIG. 4B shows another 3-dimensional graphical depiction showing how output response is degraded near diagonals D1 and D1 and maximized at the x and y axes. As shown in the figure, the output response O is graphed on the z axis as a function of x and y inputs. O is a maximum along the x and y axes and zero at the diagonals.

To implement the degrading of the output response around the diagonals, consider the following exemplary algorithm. Instead of simply summing the x and y inputs (output response O=x+y), suppose O is multiplied by a degrading function F, so that O=F(x+y), where O may be clipped to a maximum of 1. F is then chosen to be a function of the angle of input motion received. For example, suppose F=1 for motion along the x or y axis, and F=0 for motion along a 45 degree diagonal. This would produce a maximum output response along the axes, and a minimum output response along the diagonals. It is also preferable that F monotonically decreases as the angle of mouse motion goes from an axis towards a diagonal; that is, F is a maximum at the axis, and as the angle of dragging θ goes from 0° to 45°, or from 90° to 45°, F gets either progressively smaller or stays constant for each step change of θ. In this way, the output response increases when the user drags in closer alignment with the axes, and decreases when the user drags in closer alignment with the diagonals. This provides the necessary feedback to the user, by informing the user that the closer he or she drags the mouse to horizontal or vertical, the more responsive the output becomes.

Figure 5:
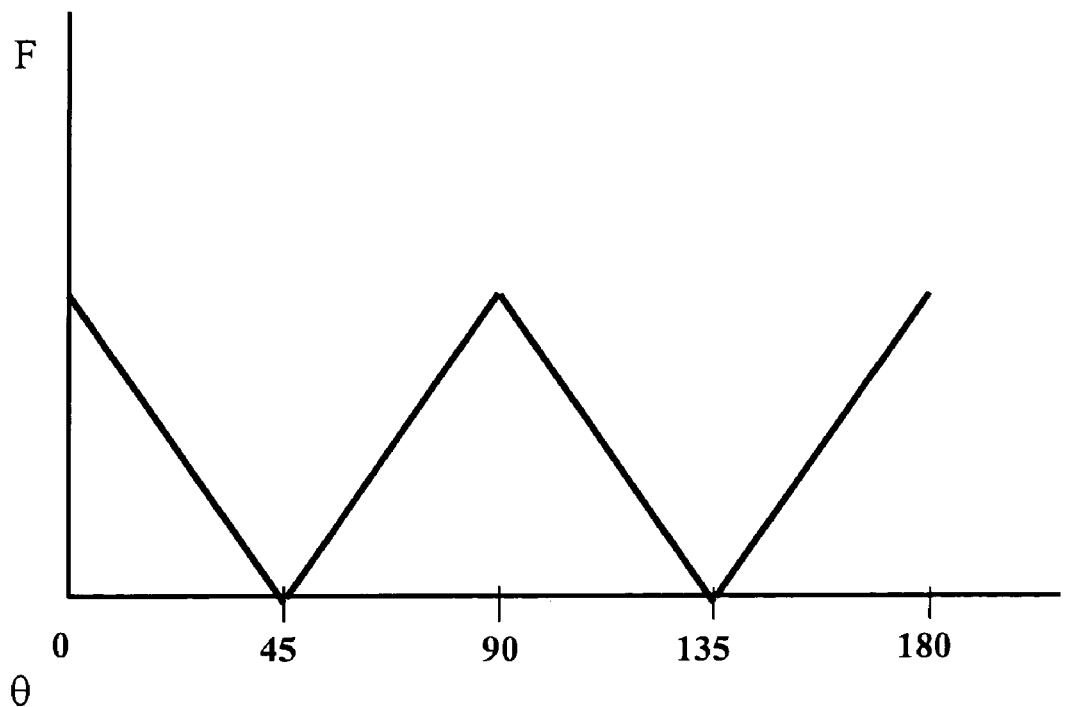
FIG. 5 is a 2-dimensional graph depicting a linear function for degrading the output response near the diagonals.
Figure 6:
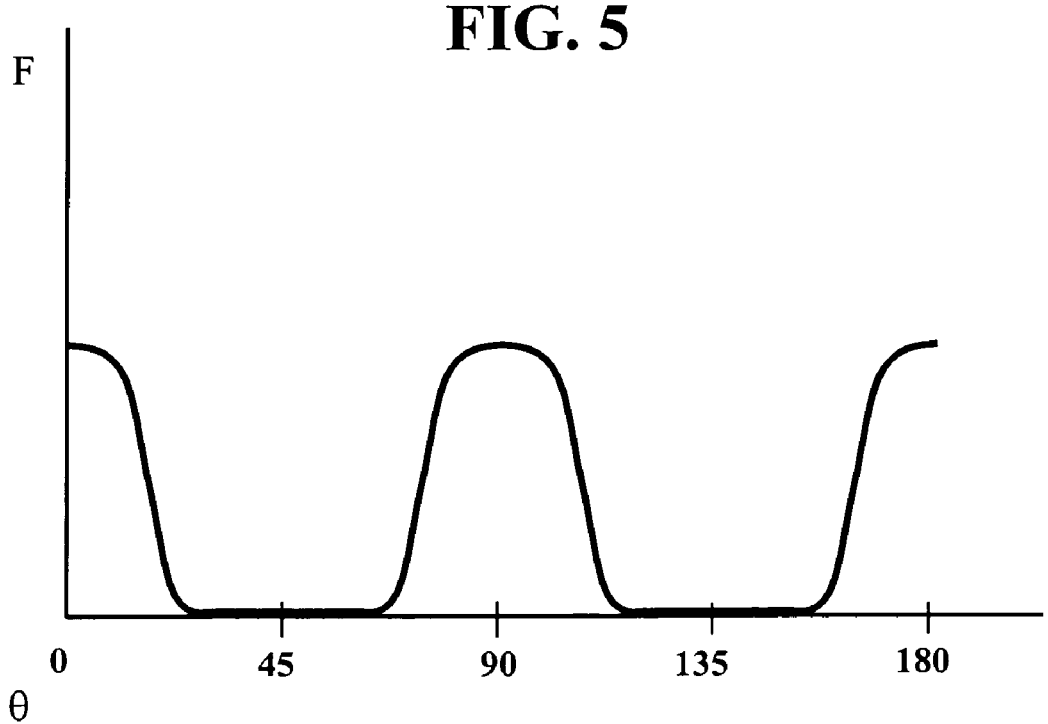
FIG. 6 is a 2-dimensional graph depicting a function for degrading the output response with a wider area of degraded response near the diagonals.

FIGS. 5 and 6 illustrate a couple of functions that could be used for F. FIG. 5 shows a simple linear function, that is monotonically decreasing between 0° and 45° and monotonically increasing between 45° to 90°. The problem with this function is that it does not have a wide area of degraded response around the diagonals. As discussed previously, it is preferable to use a function F which produces a wider area of degraded response near the diagonals. FIG. 6 shows a preferable function, where the output is degraded to zero for a wide range near the diagonals.

The function F could be implemented by F=∥|x|−|y|∥, where |x| is equal to the absolute value of x, and |y| is equal to the absolute value of y. Thus, when x and y are both asserted, i.e. equal to either 1 or −1, F will equal zero and the output O will be zero. Thus, dragging the mouse along the diagonal will not produce any response; i.e. the animation will remain frozen. However, when one of the inputs equals zero and the other input equals 1 or −1, then the degrading function F will equal 1, and the animation can be moved either forwards or backwards. This function F will produce a linear function similar to the one shown in FIG. 4. As discussed previously, the problem with this function is that it does not produce a wide degraded area of response near the diagonals.

To produce a function F with a wider area of degraded response, F could be chosen such that F=|$x^2-y^2$|. If F is chosen such that F=|$x^4-y^4$|, this will produce an even wider area of degraded response for angles near the diagonals. Other types of functions would work equally as well; it could be an linear, exponential, or any other monotonically decreasing function.

An additional embodiment for this method of controlling the animation is to produce a different output for up-down motion than for left-right motion. For example, left-right motion could control the animation of the golfer's swing while up-down motion could control an animation of the golfer's hat flying off his head.

Figure 7:
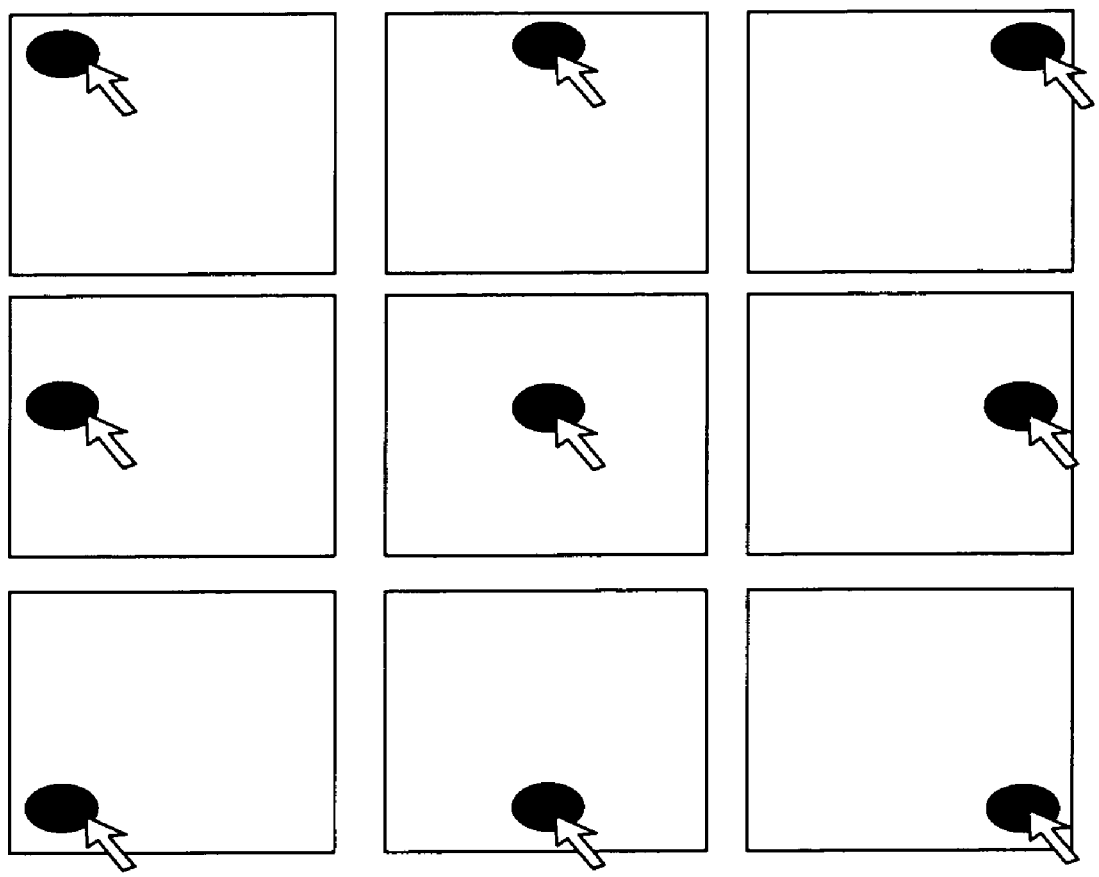
FIG. 7 is a 2-dimensional animation grid illustrating an animation of a ball which moves left, right, up and down in accordance with an x an y input from an input device.

One way to perform this type of animation control is to use a 2-dimensional grid of animation frames is depicted in FIG. 7. FIG. 7 shows a three by three grid of animation frames of a black ball. In the leftmost column of frames, the ball is located on the left side of the frame. In the middle column, the ball is located in the center of the frame. In the rightmost column, the ball is located on the right side of the frame. In the topmost row of frames the ball is at the top of the frame. In the middle row, the ball is located in the center of the frame. In the bottom row, the ball is located at the bottom of the frame. When the user drags the mouse to the right, the animation proceeds frame by frame to the right, and the ball appears to move to the right. When the user drags the mouse to the left, the animation proceeds frame by frame to the left, and the ball appears to move left. When the user drags the mouse upwards, the animation proceeds upwards frame by frame, and the ball appears to move up. When the user drags the mouse downwards, the animation proceeds downwards frame by frame, and the ball appears to move down. In this way, by dragging the mouse to the left or right, the user appears to be dragging the ball to the left or to the right. Similarly, by dragging the mouse up or down, the user appears to be dragging the ball up or down. Again, as described earlier, if the user tries dragging at a 45 degree angle, the user will get no response, and the response will increase as the user drags more towards horizontal or more towards vertical. This same method could be used with n input devices and an n-dimensional grid of animation frames.

This method of reconciling inputs to control an animation was described with respect to two inputs: an x-input and a y-input. However, the method is not limited to applications with only two inputs. The method could be applied to a system with more than two inputs. For example, suppose a 3-dimensional joystick is being used such that the joystick produces 3 inputs: an x-input, a y-input, and a z-input. The joystick can be moved in 3 dimensions. In this case, motion with an input vector (1,0,0) or (0,1,0) or (0,0,1), that is along the x, y, and z axes, would produce an output response. Motion along a diagonal such as (1,1,1) or (−1,1,1) would produce zero output response.

Another application for this method of reconciling inputs is for a multiple user context. For example, suppose there are two users playing a video game. Each user has an input device that produces a single input to move a spaceship. The above method of reconciling inputs would degrade the spaceship response when the users both tried to assert their inputs simultaneously. When the users asserted their inputs individually, however, the spaceship response would increase and the spaceship would start to move. This method would thereby encourage the users to act individually and alternately rather than simultaneously.

Another application where this method of reconciling inputs can be used, is where the system produces one type of action when it receives a first input, a second type of action when it receives a second input, a third type of action when it receives a third input, and so on. For example, imagine a real estate program that allows the user to view the inside of houses that he or she may wish to purchase. The horizontal motion of the mouse produce a first type of action: it flips the user through the different rooms of a house: living room, dining room, kitchen, etc. Vertical motions of the mouse produce a second type of action: it flips the user between the same rooms of different houses so that the user could compare houses—the kitchen in one house versus the kitchen in the next house or the kitchen in the third house. In this type of application, diagonal motion is not meaningful. The present invention would therefore discourage diagonal motion because motion along the diagonal is not meaningful for this context.

It is to be understood that the embodiments and variations shown and described herein are illustrative of the principles of the invention and that various modifications may be implemented without departing from the spirit and the scope of the invention.

What is claimed is:

1. A method of reconciling multiple inputs to a processor, comprising:
   receiving a plurality of inputs at a processor; and
   providing an output from the processor to an interface, the output based on the plurality of inputs, wherein the output has a degraded response when more than one of the plurality of inputs is asserted simultaneously and an increased response when one of the plurality of inputs is asserted significantly more than the other inputs;
   wherein said plurality of inputs are represented by an input vector in a coordinate space, and the output response is a maximum when the vector lies along a coordinate axis of the coordinate space, and the output response is a minimum when the vector lies along a diagonal in the coordinate space.

2. The method of claim 1, wherein the coordinate space is a two-dimensional coordinate space, and the inputs are an x-input and a y-input.

3. The method of claim 1, wherein the output response decreases monotonically as the input vector direction changes from an alignment along an axis to an alignment along a diagonal.

4. The method of claim 3, wherein there is an area in the vicinity of the diagonal wherein the output response is zero.

5. The method of claim 1, wherein the plurality of inputs controls an animation, and wherein the output response is moving the animation forwards and backwards.

6. The method of claim 5, wherein a single user controls the plurality of inputs.

7. The method of claim 5, wherein the plurality of inputs are summed, and then the summed value is degraded to form the output response, the degrading based on the angle theta the input vector forms with the nearest coordinate axis, wherein for small angles theta the output response is degraded little or none, whereas for angle theta near a diagonal the output response is degraded significantly.

8. The method of claim 7, wherein the output response is determined by multiplying the summed inputs by a function F wherein F is a function of the angle theta.

9. The method of claim 1, wherein a first input controls a first animation, and a second input controls a second animation.

10. The method of claim 9, wherein the first input produces an output which moves the first animation backwards and forwards, and the second input produces an output which moves a second animation backwards and forwards.

11. The method of claim 1, wherein the first input produces a first type of output response, and the second input produces a second type of output response.

12. The method of claim 11, wherein the first type of output response is displaying a picture of a different room within a house, and the second type of output response is displaying a room within a different house.

13. The method of claim 1, wherein the plurality of inputs are received from a plurality of users, each user controlling at least one input.

14. The method of claim 13, wherein the plurality of users are all controlling the same output, wherein the more the users act individually the more the output responds, and the more the users act simultaneously the more the output is degraded.

15. A computer system for reconciling multiple inputs and providing an output to an interface, comprising:
   at least one input device controlled by at least one user;
   a storage device storing data;
   a display;
   a frame buffer coupled to the display storing images to be shown on the display;
   a processor coupled to the storage device, the at least one input device and the frame buffer, wherein the processor:
   (a) receives a plurality of inputs from the at least one input device;
   (b) combines the inputs to form an output response and degrades the output response when multiple inputs are asserted simultaneously, and increases the output response when one input is asserted substantially more than the other inputs;
   (c) accesses the data in the storage device, and
   (d) outputs the data to the frame buffer in accordance with the output response
   wherein said plurality of inputs are represented by an input vector in a coordinate space, and the output response is a maximum when the vector lies along a coordinate axis of the coordinate space and the output response is a minimum when the vector lies along a diagonal in the coordinate space.

16. The system of claim 15, wherein the processor is connected to a communications channel and the processor receives at least one of data and instructions over the communications channel.

17. A computer readable medium comprising a computer program product for reconciling a plurality inputs, comprising:
   computer usable code for producing an output response based on the plurality of inputs, and degrading the output response when the inputs are asserted simultaneously and increasing the output response when one input is asserted substantially more than the other inputs, wherein said plurality of inputs are represented by an input vector in a coordinate space, and the output response is a maximum when the vector lies along a coordinate axis of the coordinate space, and the output response is a minimum when the vector lies along a diagonal in the coordinate space.

* * * * *

UNITED STATES PATENT AND TRADEMARK OFFICE
CERTIFICATE OF CORRECTION

PATENT NO. : 6,954,196 B1
DATED : October 11, 2005
INVENTOR(S) : J.S. Lipscomb et al.

It is certified that error appears in the above-identified patent and that said Letters Patent is hereby corrected as shown below:

Title page,
Item [75], Inventors, delete "Hoffman" and insert -- Roffman --.

Column 10,
Line 36, insert -- , -- after the word "space".

Signed and Sealed this

Twenty-second Day of November, 2005

JON W. DUDAS
*Director of the United States Patent and Trademark Office*